US008615862B2

(12) United States Patent
Traska

(10) Patent No.: US 8,615,862 B2
(45) **Date of Patent: *Dec. 31, 2013**

(54) ROOFING MEMBRANE PULLER AND METHOD OF USE

(75) Inventor: Jeff Traska, Wausau, WI (US)

(73) Assignee: Duro-Last, Inc., Saginaw, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/075,925

(22) Filed: Mar. 30, 2011

(65) Prior Publication Data

US 2012/0211708 A1 Aug. 23, 2012

Related U.S. Application Data

(63) Continuation of application No. 10/950,872, filed on Sep. 27, 2004, now Pat. No. 7,979,968.

(51) Int. Cl.
*B23P 19/04* (2006.01)

(52) U.S. Cl.
USPC .............................. 29/267; 254/202; 254/209

(58) Field of Classification Search
USPC ............ 29/244, 267; 254/199, 202, 208, 209, 254/242, 243, 251, 263
See application file for complete search history.

(56) References Cited

U.S. PATENT DOCUMENTS

| | | | | |
|---|---|---|---|---|
| 3,022,979 | A * | 2/1962 | Dahlke | 254/209 |
| 3,168,119 | A | 2/1965 | Schwester et al. | |
| 3,789,496 | A | 2/1974 | Barabas | |
| 3,958,318 | A | 5/1976 | Crosa | |
| 4,742,992 | A * | 5/1988 | Allen | 254/199 |
| 5,361,475 | A | 11/1994 | Scruggs | |
| 5,938,182 | A * | 8/1999 | Goodrich et al. | 254/209 |
| 6,840,299 | B2 * | 1/2005 | Allen et al. | 156/763 |
| 7,032,886 | B1 * | 4/2006 | Kraft | 254/200 |
| 7,827,663 | B2 * | 11/2010 | Cook et al. | 29/244 |
| 7,979,968 | B2 | 7/2011 | Traska | |
| 2004/0169170 | A1 * | 9/2004 | Hernandez, Jr. | 254/243 |

* cited by examiner

*Primary Examiner* — David Bryant
*Assistant Examiner* — Christopher Koehler
(74) *Attorney, Agent, or Firm* — Reising Ethington PC

(57) ABSTRACT

A membrane puller and related method. The puller includes a frame including a front end and a rear end, a lever assembly, a clamp assembly carried by the frame and including an elongate body slidably received by the front end of the frame and a clamp member fixed to the body, and a cable having one end attached to the lever assembly and another end attached to the clamp assembly, wherein the lever assembly is movable toward the front end of the frame to place the cable in tension to pull the clamp assembly toward the front end of the frame such that the elongate body slidably moves toward the rear end of the frame.

4 Claims, 5 Drawing Sheets

ROOFING MEMBRANE PULLER AND METHOD OF USE

CROSS REFERENCE TO RELATED APPLICATION

This application is a continuation of U.S. patent application Ser. No. 10/950,872 filed Sep. 27, 2004. The disclosure of the above application is incorporated herein by reference in its entirety.

TECHNICAL FIELD

This disclosure relates generally to apparatus which is used for pulling large sheets of material over an underlying surface, and more particularly to apparatus which is used for pulling roofing membrane over an underlying roof surface.

BACKGROUND

Buildings, particularly those having flat roof surfaces, often have a waterproof membrane material laid over the roof surface. The roofing membrane material is typically provided in large sheets which are pulled tautly over the surface of the roof. Generally, it is difficult to lay the roofing material in a finished state so that it is wrinkle-free in appearance. As such, much physical effort and time is expended in attempting to remove the wrinkles during the application of the roofing membrane so that the roof surface is properly installed and aesthetically pleasing.

Generally, persons laying roofing membrane need to move as quickly as possible. Some known membrane pullers are helpful in aiding a user in pulling the roofing membrane taut, and thus, assist in the user's ability to complete laying the membrane more quickly. However, the known membrane pullers require the user to repeatedly bend over to clamp and release the roofing membrane from between a pair of jaws on the puller. Accordingly, efforts to quickly lay the roofing membrane in place for fastening are delayed. In addition, the repeated bending generally causes the user of the membrane puller to tire, thus, further impacting the user's ability to quickly lay the roofing membrane over the roof.

BRIEF SUMMARY

According to one embodiment a method of pulling a sheet of membrane material tautly over an underlying surface. The method includes the steps of providing a membrane puller having a frame and a lever assembly pivotally attached to the frame for pivotal movement between a first position and a second position. The membrane puller further has a clamp member with a pair of jaws moveable between a clamped first position and an unclamped second position, wherein the clamp member moves in response to pivotal movement of the lever arm from its first position toward its second position. The membrane puller further includes an actuator arm in operable communication with one of the jaws. The user begins by placing the membrane material between the pair of jaws while in their unclamped second position. Next, upon placing a foot on the actuator arm, the user presses the foot downwardly on the actuator arm to move the jaws to their clamped first position to clamp the membrane material between the jaws. The user then moves the lever assembly to its second position to pull the membrane material toward the frame and fastens the membrane material to the underlying surface generally adjacent the membrane puller. The user finally places the foot generally beneath the actuator arm and lifts upwardly on the actuator arm with the foot to move the jaws to their unclamped second position to release the membrane material from between the jaws.

According to another embodiment, a membrane puller includes a frame including a front end and a rear end, a lever assembly, and a clamp assembly carried by the frame. The clamp assembly includes an elongate body slidably received by the front end of the frame, and a clamp member fixed to the body. The clamp member includes an upper jaw, a release lever carried by the upper jaw, a lower jaw, and an actuator arm pivotally attached to the upper jaw, engageable with the release lever when the actuator arm is pivoted with respect to the upper jaw, and extending to a free end beneath which a foot is placeable to exert an upward force on the actuator arm to open the jaws and release the membrane material. The membrane puller also includes a cable having one end attached to the lever assembly and another end attached to the clamp assembly, wherein the lever assembly is movable toward the front end of the frame to place the cable in tension to pull the clamp assembly toward the front end of the frame such that the elongate body slidably moves toward the rear end of the frame.

According to a further embodiment, a membrane puller includes a frame having a front end, a rear end, sides extending between the front and rear ends, and a guide support extending between the sides. The puller also includes a lever assembly having a first portion with an end pivotally attached to the frame, and having a link arm with one end attached to the first portion and another end slidably attached to the frame in response to pivotal movement of the lever assembly with respect to the frame. The puller further includes a spring having one end generally fixed relative to the frame and another end adapted for operable attachment to the link arm to bias the lever arm. The puller additionally includes a clamp assembly carried by the frame, and including an elongate body slidingly received by the front end and the guide support of the frame, and also including a clamp member fixed to the body, and a pulley supported for rotation by the frame adjacent the rear end of the frame. The puller also includes a cable having one end attached to the first portion of the lever assembly and another end attached to the body of the clamp assembly and being entrained about the pulley, wherein the lever assembly is movable toward the front end of the frame against a bias force of the spring to place the cable in tension to pull the clamp assembly toward the front end of the frame such that the elongate body slidably moves toward the rear end of the frame.

Some of the objects, features and advantages may include, but are not limited to, providing a membrane puller that improves the efficiency of a user in laying membrane material over an underlying surface, reduces fatigue, is more ergonomic in use, is relatively simple in design and economical in manufacture, is durable, and has a long and useful life.

BRIEF DESCRIPTION OF THE DRAWINGS

These and other objects, features and advantages of this invention will become apparent in view of the following detailed description of the presently preferred embodiments and best mode, appended claims and accompanying drawings, in which:

DETAILED DESCRIPTION OF THE PREFERRED EMBODIMENTS

Figure 1:
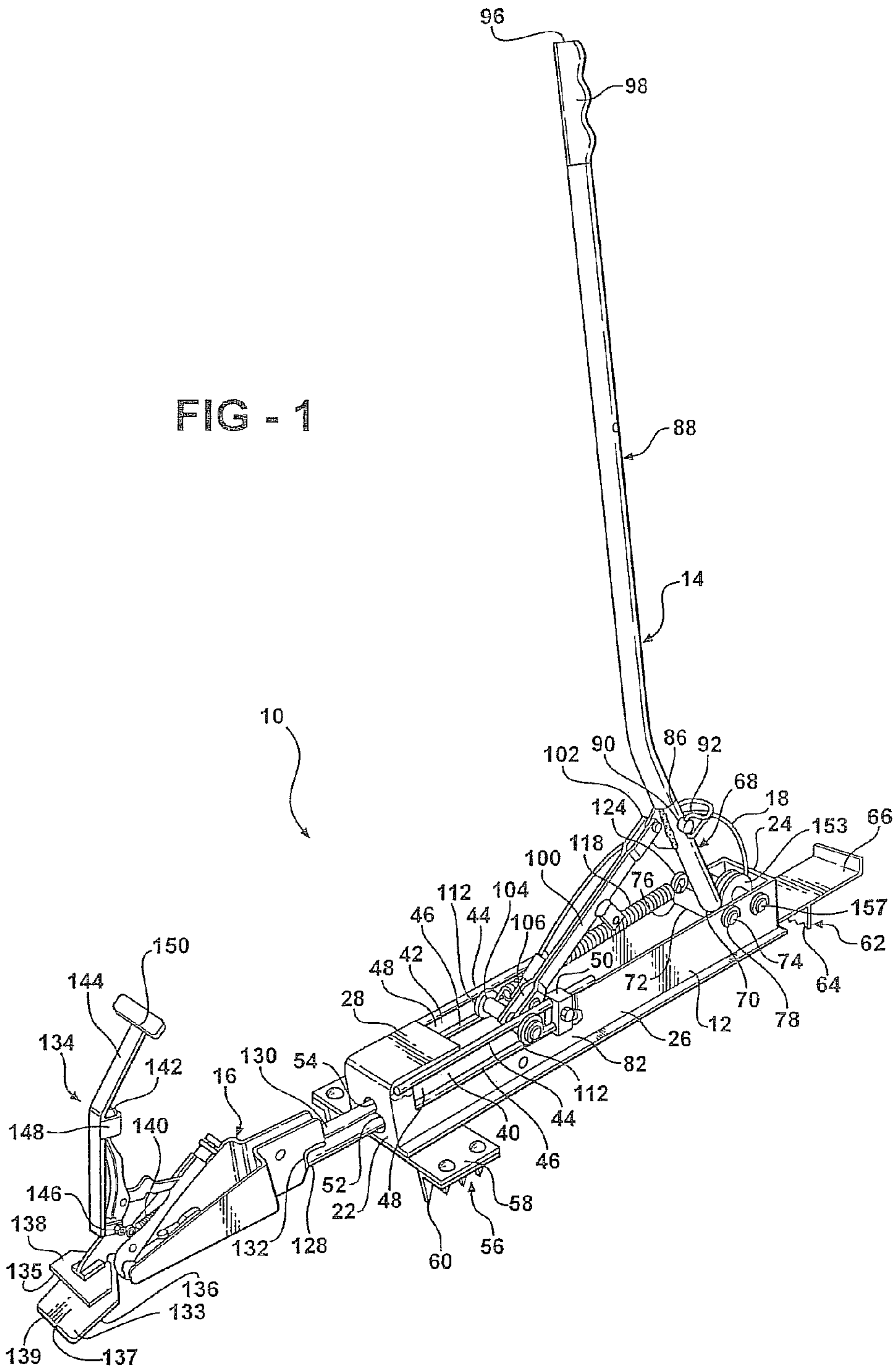
FIG. 1 is a perspective view of a membrane puller constructed according to one embodiment of the invention.
Figure 5:
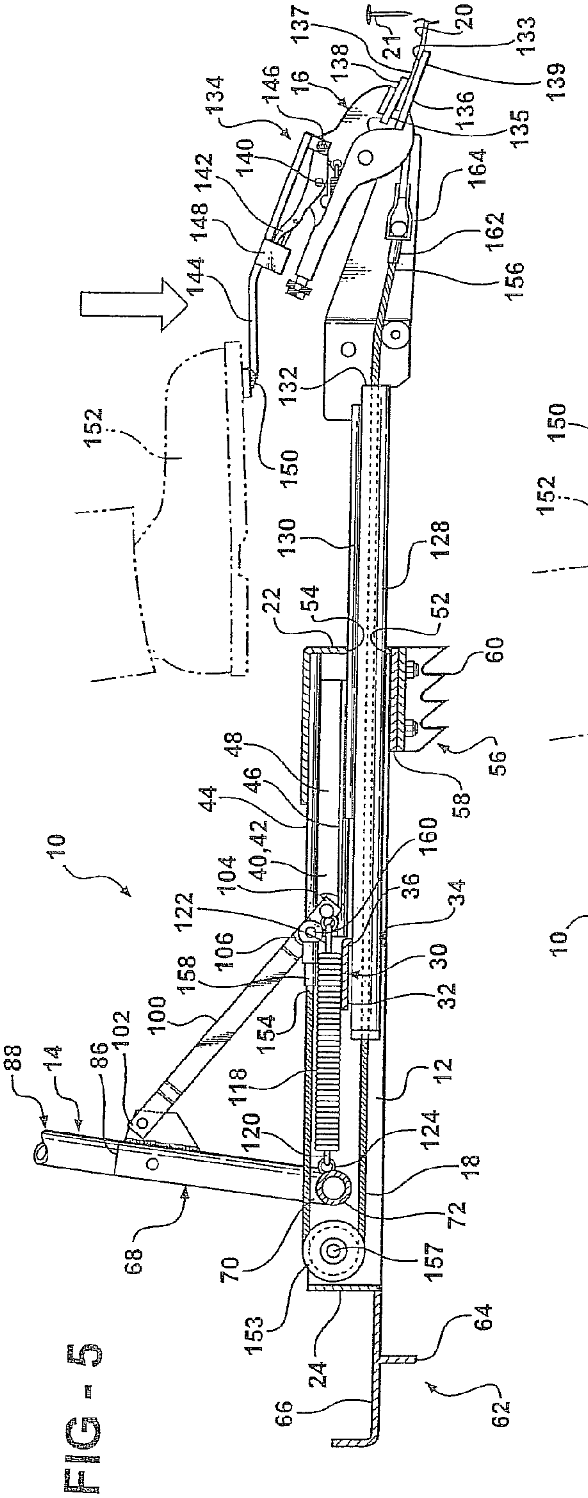
FIG. 5 is a fragmentary elevation view of the membrane puller with a user's foot clamping a sheet of membrane material between the jaws of the clamp assembly.
Figure 6:
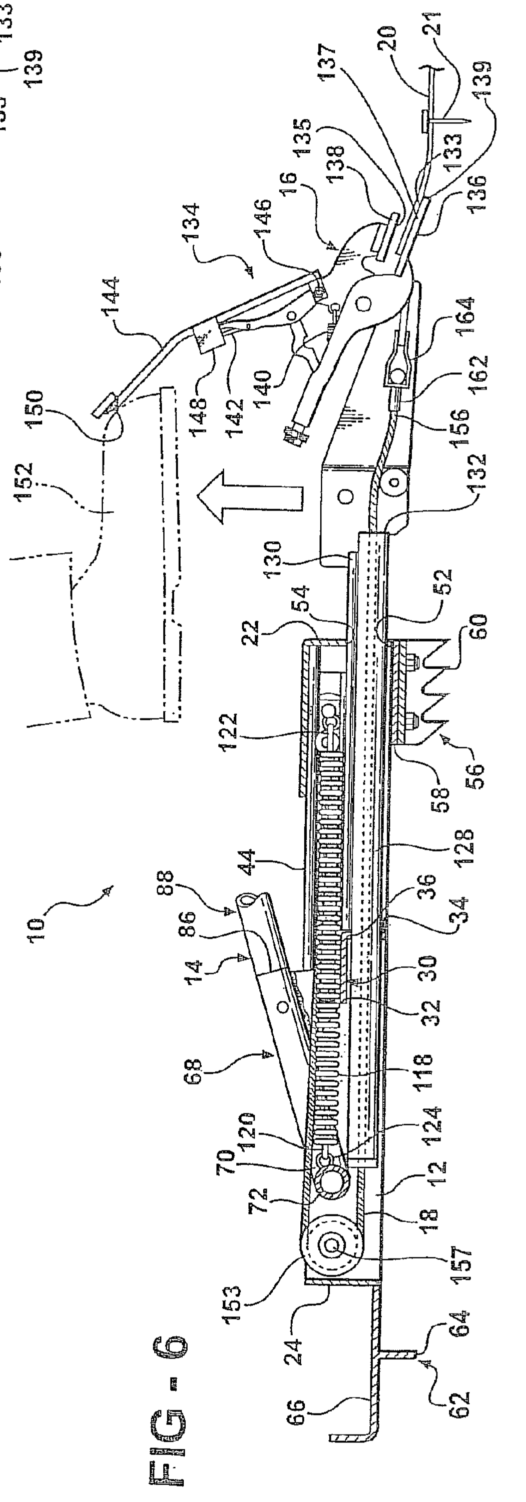
FIG. 6 is a view similar to FIG. 5 with the user's foot unclamping the sheet of membrane material from between the jaws of the clamp assembly.

Referring in more detail to the drawings, FIG. 1 illustrates a membrane puller 10 constructed according to one presently preferred embodiment of the invention. The membrane puller 10 has a frame 12 with a handle or lever assembly 14 pivotally attached thereto for movement between first and second positions. A clamp assembly 16 is in operable communication with the lever assembly 14 via a cable 18 and is operable to clamp onto a sheet of membrane material 20 (FIG. 5), such as roofing membrane material for example, to facilitate a user's ability to install the roofing membrane material 20 on an underlying surface, such as a surface of a roof, for example. With the roofing membrane material 20 clamped by the clamp assembly 16, the user moves the lever assembly 14 from the first position (FIG. 5) to the second position (FIG. 6) to exert a pulling force on the membrane material 20 to pull the membrane material 20 tautly and evenly over the roof surface. Upon installing fasteners 21 (FIG. 6) to secure the membrane material 20 to the roof surface, the user unclamps the membrane material 20 and moves the membrane puller 10 to a new position along the underlying roof surface and again clamps the membrane material 20 to continue the installation of the material.

The frame 12 is constructed generally similar to the frame disclosed in U.S. Pat. No. 4,742,992 to Allen, which is owned by the applicant's assignee, and incorporated herein by reference in its entirety. The frame 12 includes a front end 22 and a rear end 24 with a pair of laterally spaced sides 26, 28 extending therebetween. Desirably, a guide support 30 extends between the sides 26, 28 generally midway between the front and rear ends 22, 24. The guide support 30 is shown as a generally L-shaped bracket with an axially extending horizontal wall 32 and a laterally extending upright wall 34 having an opening 36 therethrough.

Each side 26, 28 of the frame 12 has an axially extending channel portion 40, 42, respectively. The channel portions 40, 42 preferably extend from adjacent the front end 22 toward the rear end 24, and are shown here as terminating adjacent the guide support 30. Desirably, each channel portion 40, 42 has an upper guide rail 44 and a lower guide rail 46 to define a guide slot or channel 48 in which a portion of the lever assembly 14 traverses during movement of the lever assembly 14 between its first and second positions. To facilitate limiting or adjusting the travel of the lever assembly 14 between its first and second positions, a stop member 50 can be incorporated for adjustable movement between each of the upper and lower guide rails 44, 46. The front end 22 has an opening 52 in axial alignment with the opening 36 in the guide support 30 and desirably has a key slot 54 extending radially outwardly from the opening 52.

The frame 12 has a front anchor member 56 attached to the sides 26, 28 generally adjacent the front end 22 with a plate 58 extending laterally from the sides 26, 28 of the membrane puller 10. The plate 58 has a pair of downwardly extending serrated or jagged claws 60 attached adjacent its ends to facilitate maintaining the membrane puller 10 in a fixed location while in use. To further facilitate a user's ability to maintain the membrane puller 10 in a fixed location, desirably, the membrane puller 10 has a rear anchor 62 having downwardly extending jagged claws 64 generally adjacent the rear end 24. Desirably, the rear anchor 62 has a footplate 66 extending axially rearwardly from the rear end 24 of the frame 12 to provide a stepping location for a user's foot. As such, a user presses his foot downwardly on the foot plate, thereby pressing the claws 64 of the rear anchor 62 into gripping engagement with the underlying surface.

The lever assembly 14 preferably has a first portion 68 with an end 70 pivotally attached to the frame 12 between the sides 26, 28 generally adjacent the rear end 24. The end 70 preferably has a laterally extending tubular support 72 sized for receipt between the sides 26, 28 of the frame 12. A shaft 74 sized for receipt within the support 72 is received within a pair of generally opposite openings 76 in the sides 26, 28, and is secured to the frame 12 via a pair of c-clips 78 adjacent opposite ends of the shaft 74 and adjacent an outer surface 82 of the sides. As such, the first portion 68 of the lever assembly 14 is pivotally supported at one of its ends 70 by the shaft 74, while having another free end 86 extending generally upwardly therefrom. Desirably, the first portion 68 is at least partially tubular, preferably adjacent the free end 86, thereby being adapted to receive a second portion 88 of the lever assembly 14 within the tubular portion of the free end 86. To facilitate maintaining the second portion 88 in attached relation to the first portion 68, desirably the first portion 68 has an opening or pair of openings 90 extending therethrough generally adjacent the free end 86. The openings 90 are sized for receipt of a lock pin 92 to releasably maintain the first and second portions 68, 88 in attached relation to one another in use. The second portion 88 has an end 94 sized for receipt in the free end 86 of the first portion 68 and desirably has a through opening (not shown) sized for receipt of the lock pin 92. The second portion 88 extends generally upwardly from the frame 12 to a free end 96. The free end 96 preferably has a handle 98 attached thereto to facilitate a user's ability to grasp the free end 96 while moving the lever assembly 14 between its first and second positions. When desired, the second portion 88 of the lever assembly 14 may be removed from the first portion 68 by removing the lock pin 92 from engagement between the two portions 68, 88, such that the second portion 88 may be stowed along one of the sides 26, 28 of the frame 12. Desirably, the lock pin 92 may be used to maintain the second portion 88 in its stowed position.

The lever assembly 14 has a link arm 100 with one end 102 of the link arm 100 being attached adjacent the free end 86 of the first portion 68. Another end 104 of the link arm 100 is adapted for operable attachment to the frame 12 for slideable movement relative to the sides 26, 28 of the frame 12 in response to pivotal movement of the lever assembly 14 between its first and second positions. Desirably, the end 104 of the link arm 100 has a bifurcated portion 106 with a pair of axially aligned through openings 108 sized to receive a shaft 110. The shaft 110 extends generally laterally between the sides 26, 28 for sliding receipt in the channels 48. Preferably, an anti-friction device, such as a bearing or rolling element 112 is received adjacent each end of the shaft 110 to facilitate axial movement of the shaft 110 in the channels 48 as the lever assembly 14 is moved between its first and second positions. The rolling elements 112 preferably have an annular groove to facilitate rolling engagement along the upper and lower guide rails 44, 46.

Figure 2:
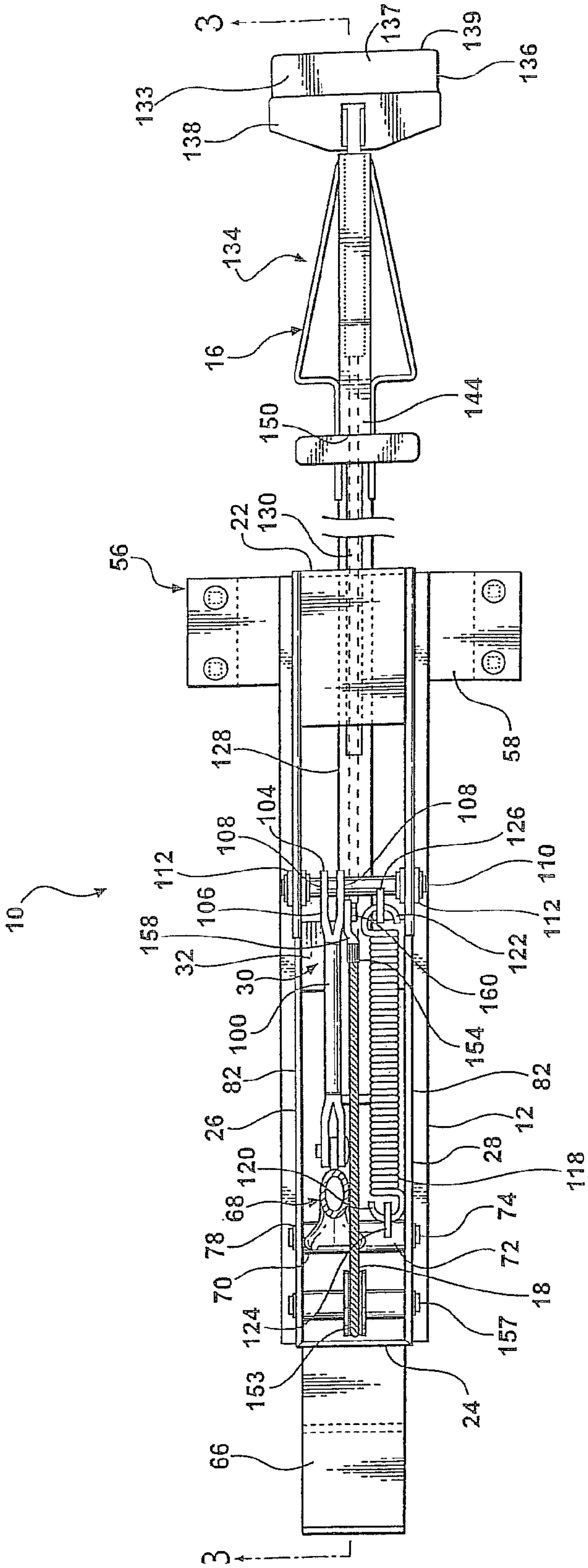
FIG. 2 is a plan view of the membrane puller.
Figure 3:
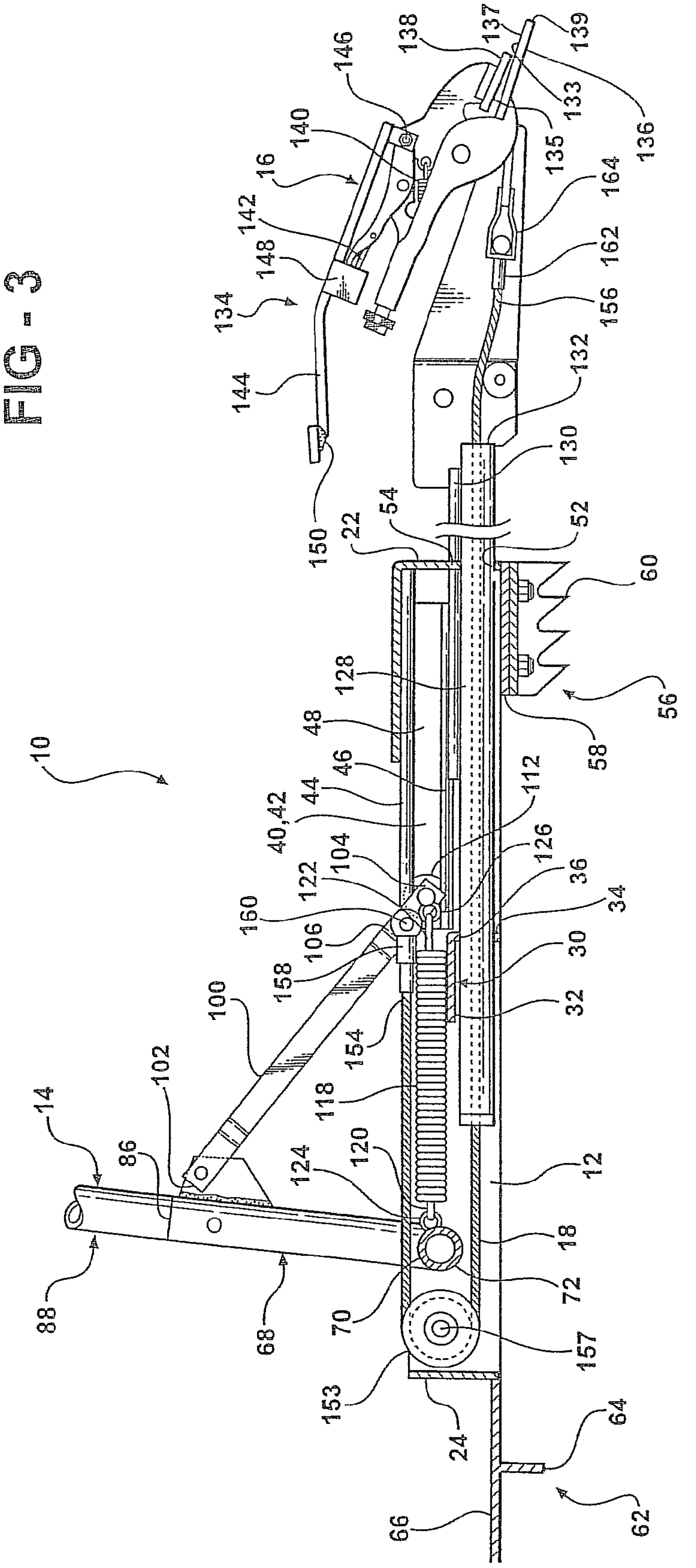
FIG. 3 is a cross-sectional elevation view taken generally along line 3-3 of FIG. 2.
Figure 4:
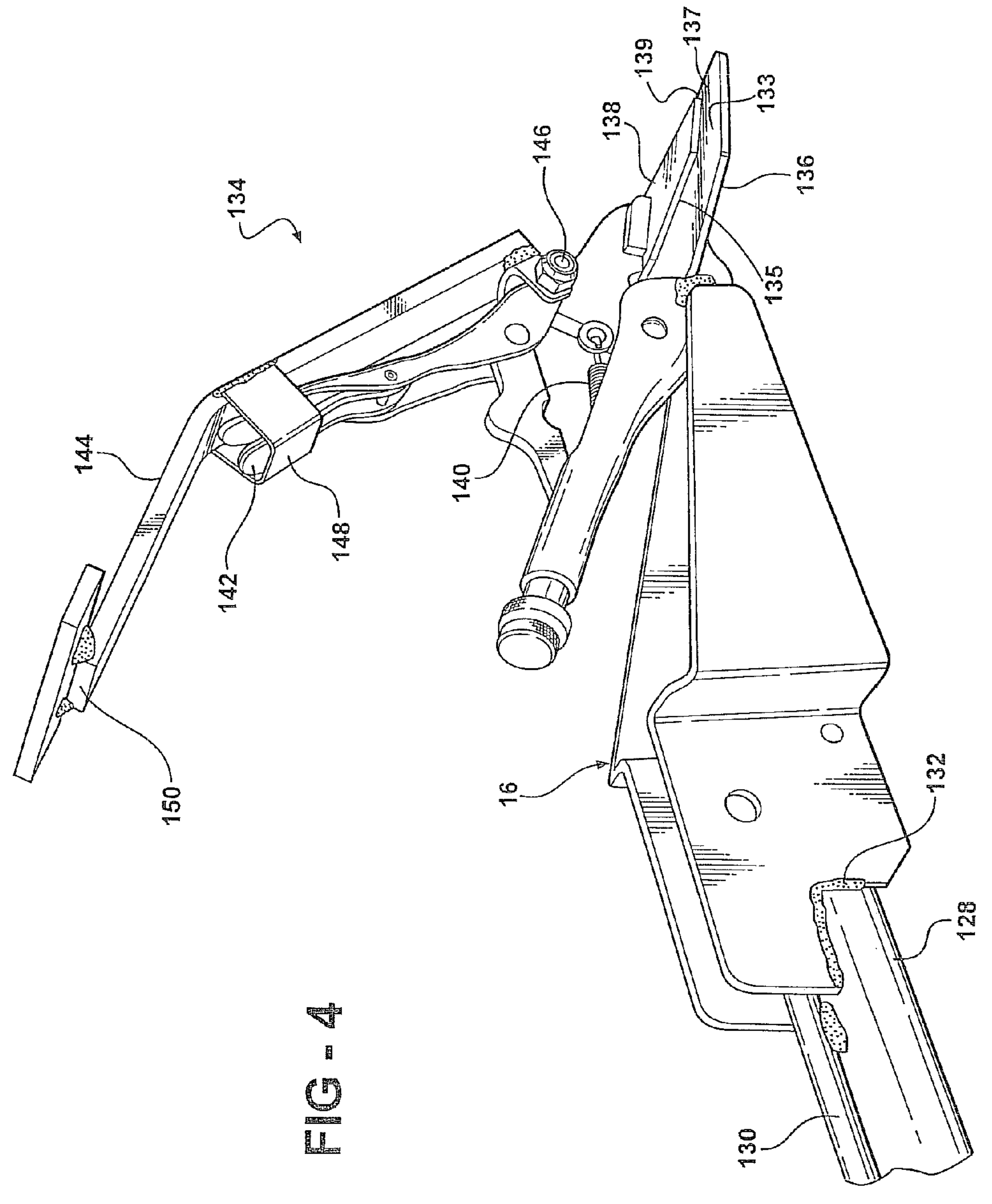
FIG. 4 is an enlarged fragmentary perspective view of a clamp assembly of the membrane puller.

A spring, such as a coil spring 118, for example, has one end 120 generally fixed relative to the frame 12 and another end 122 adapted for operable attachment to the link arm 100 for conjoint movement therewith. One end 120 of the spring 118 is shown here being attached to a hook or ring 124 (FIGS. 2 and 3) extending from the support 72 on the first portion 68 of the lever assembly 14. The other end 122 of the spring 118 is shown attached to a hook or ring 126 extending from the shaft 110 supporting the link arm 100. The spring 118 is generally sized to be placed in tension when the lever assembly 14 is in its first position, thereby biasing the lever assembly 14 toward one of its first or second positions, and shown here as the first position. In use, a user may push on the handle 98 of the lever assembly 14 to overcome the bias of the spring 118, thereby causing the lever assembly 14 to move from its first position to its second position.

The membrane sheet clamp assembly 16 is adapted to be carried by the frame 12 and has a generally elongate carrier portion or body 128 sized for close sliding receipt in the openings 36, 52 through the guide support 30 and front end 22, respectively. Desirably, the body 128 has an axially extending rib 130 along an outer surface of the body 128 sized for sliding receipt within the key slot 54. As such, the rib 130 facilitates maintaining the body 128, and thus, the clamp assembly 16 in the desired and generally fixed radial position relative to the longitudinal axis of the membrane puller 10. The body 128 is preferably constructed from tubular material, and therefore, is generally tubular through its length. One end 132 of the body 128 extends axially outwardly from the front end 22 of the frame 12 and is adapted for operable attachment to a clamp member 134 on the clamp assembly 16.

The clamp member 134 has a pair of jaws, shown here as a lower jaw 136 fixed to the body 128, such as through a weld joint, for example, and an upper jaw 138 operably attached to the lower jaw 136 for relative pivotal movement therewith. The lower jaw 136 and upper jaw 138 have generally enlarged opposing planar surfaces 133, 135, respectively, to increase the surface area for clamping onto the membrane material 20. As such, the membrane material 20 can be firmly clamped between the jaws 136, 138 without damaging or piercing the membrane material 20. In addition, the lower jaw 136 is generally inclined downwardly to provide a ramped surface 137 to facilitate guiding and receiving the membrane material between the jaws 136, 138 without having to bend over at the waist to place the material 20 between the jaws 136, 138 by hand. The ramped surface 137 is generally arranged to orient a leading edge 139 substantially adjacent to or in abutment with the underlying surface to facilitate disposing the membrane material 20 between the jaws 136, 138. Accordingly, the user may simply push the membrane puller 10 toward the membrane material 20 until the material is scooped or disposed automatically over the edge 139 and between the jaws 136, 138 without having to manually place the material by hand between the jaws 136, 138. The lower and upper jaws 136, 138 are moveable between a first clamped position (FIG. 5) to clamp onto the membrane material 20, and a second unclamped position (FIG. 6) to release or initially receive the membrane material 20. When in the clamped position, the clamp member 134 remains clamped under a biasing force imparted by a spring 140 acting between the lower and upper jaws 136, 138. To release the clamp member 134 from its clamped position, an upward force is applied to a release lever 142 carried pivotally by the upper jaw 138. When the force is applied to the release lever 142, the jaws 136, 138 are free to move from their clamped or closed first position to their unclamped or open second position.

To facilitate a user's ability to move the clamp member 134 between its clamped and unclamped positions, the clamp member 134 has an actuator arm 144 in operable communication with one of the lower and upper jaws 136, 138 and shown here as the upper jaw 138. The actuator arm 144 is pivotally attached by a pin or bolt 146 to the upper jaw 138. The actuator arm 144 has a hoop or ring 148 arranged to engage the release lever 142 when the actuator arm 144 is pivoted generally away from the upper jaw 138. Accordingly, when a user lifts up on the actuator arm 144, the ring 148 exerts an upward force on the release lever 142, thereby causing the clamp member 134 to move to its unclamped position. The actuator arm 144 extends to a free end 150 that is spaced from the frame 12. Accordingly, the user may place a foot 152 beneath the free end 150 of the actuator arm 144 to exert an upward force on the actuator arm 144, thereby actuating the clamp member 134 to open the jaws 136, 138 and release the membrane material 20 from between the lower and upper jaws 136, 138. Conversely, the user may engage the membrane material 20 between the opened lower and upper jaws 136, 138, and thereafter exert a downward force on the foot pedal 150 to actuate the clamp member 134 to move the jaws 136, 138 to the clamped position. As such, the clamp assembly 16 is fully actuatable or operable by the user's foot 152, thereby eliminating the need for the user to bend over to operate the clamp assembly 16 by hand.

To operably communicate the lever assembly 14 with the clamp assembly 16, the cable 18 is entrained at least partially about a pulley 153 and has one end 154 adapted for operable attachment to the lever assembly 14 for conjoint movement with the link arm 100 and another end 156 adapted for operable attachment to the body 128. The pulley 153 is supported for rotation generally adjacent the rear end 24 of the frame 12 by a shaft 157 extending between the sides 26, 28. The one end 154 of the cable 18 preferably has an eyelet 158 attached thereto, for example by being crimped thereon, for attachment to a pin 160 extending from the link arm 100. The cable 18 extends from the link arm 100 toward the rear end 24 where it is entrained approximately 180 degrees about the pulley 153, and then extends toward the front end 22 for operable attachment to the clamp assembly 16. The other end 156 preferably has a pivotal connector, for example a T-connector with a T-head 162 attached thereto, such as by crimping. A T-receptacle 164 is desirably fixed to the clamp member 134, shown here as being attached to the lower jaw 138. Accordingly, when the lever assembly 14 is moved from its first position to its second position, the cable 18 is placed in tension to pull the clamp assembly 16 toward the front end 22 of the membrane puller 10. As such, the membrane material 20 is pulled taut to its desired position, and is then secured by fasteners 21 to the roof surface. This process is repeated as necessary to install the membrane material 20.

In use, the user can readily carry the membrane puller 10, as necessary, to pull the membrane material 20 over the underlying roof surface. When in position, the clamp assembly 16 is moved to its unclamped position for receipt of the membrane material 20. Then, the user preferably begins by placing a foot on the actuator arm 144 to press generally downwardly on the free end 150 of the actuator arm 144 to move the clamp assembly 16 to its clamped position, thereby clamping the membrane material 20 between the lower jaw and upper jaws 136, 138. The user then moves the lever assembly 14 from its first position to its second position to pull the membrane material taut over the underlying roof surface. The user then fastens the membrane material 20 to the underlying surface. Upon fastening the material in place, the user releases the clamp assembly 16 from the membrane material 20 by placing a foot generally beneath the actuator arm 144 to lift generally upwardly on an under surface of the actuator arm 144 with the upper surface of the foot. With the clamp assembly 16 in its unclamped position, the user moves the membrane puller 10 to a new location to continue pulling the selected sheet of membrane material 20 over the underlying roof surface.

It should be recognized that the embodiments of the membrane puller discussed above are intended to be illustrative of some presently preferred embodiments of the invention, and not limiting. Various modifications within the spirit and scope of the invention will be readily apparent to those skilled in the art. The invention is defined by the claims that follow.

What is claimed is:

1. A membrane puller comprising:

a frame including a front end and a rear end;

a lever assembly;

a clamp assembly carried by said frame and including:

an elongate body slidably received by said front end of said frame, and a clamp member fixed to said body and having:

an upper jaw, a release lever carried by said upper jaw, a lower jaw, and an actuator arm pivotally attached to said upper jaw, engageable with said release lever when said actuator arm is pivoted with respect to said upper jaw, and extending to a free end beneath which a foot is placeable to exert an upward force on said actuator arm to open said jaws and release the membrane material; and a cable having one end attached to said lever assembly and another end attached to said clamp assembly, wherein said lever assembly is movable toward said front end of said frame to place said cable in tension to pull said clamp assembly toward said front end of said frame such that said elongate body slidably moves toward said rear end of said frame.

2. The membrane puller of claim 1 wherein said lower jaw is longer than said upper jaw and inclined downwardly to a leading edge to provide a ramped surface to facilitate guiding and receiving membrane material between said jaws.

3. The membrane puller of claim 1 wherein said frame includes sides extending between said front and rear ends, and a guide support extending between said sides, and said elongate body is also slidably received by said guide support.

4. The membrane puller of claim 1 wherein said lever assembly has a first portion with an end pivotally attached to said frame, and has a link arm with one end attached to said first portion and another end slidably attached to said frame in response to pivotal movement of said lever assembly with respect to said frame, and the membrane puller further comprises a spring having one end generally fixed relative to said frame and another end adapted for operable attachment to said link arm to bias said lever arm, and a pulley supported for rotation by said frame adjacent said rear end of said frame, wherein said one end of said cable is attached to said first portion of said lever assembly and said another end of said cable attached to said body of said clamp assembly and is entrained about said pulley.

* * * * *